United States Patent [19]
Ohno et al.

[11] Patent Number: 5,970,381
[45] Date of Patent: Oct. 19, 1999

[54] METHOD FOR FABRICATING ORGANIC THIN FILM

[75] Inventors: Hirotaka Ohno; Larry A. Nagahara; Hiroshi Tokumoto, all of Tsukuba, Japan

[73] Assignee: National Institute for Advanced Interdisciplinary Research, Ibaraki, Japan

[21] Appl. No.: 08/924,697

[22] Filed: Sep. 5, 1997

[30] Foreign Application Priority Data

Sep. 5, 1996 [JP] Japan ................................. 8-255603

[51] Int. Cl.$^6$ ................................................. H01L 21/265
[52] U.S. Cl. .......................... 438/758; 438/939; 438/623; 438/622; 438/779; 438/780; 438/761; 438/781
[58] Field of Search ................................. 427/123, 126.1, 427/58; 438/758, 939, 623, 622, 779, 780, 99, 761, 781

[56] References Cited

U.S. PATENT DOCUMENTS

| | | | |
|---|---|---|---|
| 5,079,179 | 1/1992 | Josefowicz et al. | 438/939 |
| 5,284,779 | 2/1994 | Miyanaga | 438/939 |
| 5,363,697 | 11/1994 | Nakagawa | 73/105 |
| 5,684,165 | 11/1997 | Cabrera et al. | 549/50 |
| 5,795,699 | 8/1998 | Zhou et al. | 430/318 |

OTHER PUBLICATIONS

H. Lee, et al. "Adsorption of Ordered Zirconium Phosphonate Multilayer Films on Silicon and Gold Surfaces", J. Phys. Chem., vol. 92.(1988) pp. 2597–2601.

A. Ulman, et al. "Self–Assembling Double Layers on Gold Surfaces: The Merging of Two Chemistries", Langmuir, vol. 5, No. 6,(1989), pp. 1418–1420.

N. Tillman, et al. "Formation of Multilayers by Self–Assembly", Langmuir, vol. 5, No. 1 (1989), pp. 101–111.

*Primary Examiner*—Charles Bowers
*Assistant Examiner*—Thanh Nguyen
*Attorney, Agent, or Firm*—Oblon, Spivak, McClelland, Maier & Neustadt, P.C.

[57] ABSTRACT

A method is provided that produces a good, strong organic monomolecular film having its atoms arranged in a three-dimensionally ordered manner by cleaving a III–V group compound semiconductor substrate in film formation molecules or in a solution containing them, in order to cause selective chemisorption which forms a monomolecular film and then deposits another layer of organic molecule film. In this method, the III–V group compound semiconductor substrate is cleaved in a solution containing SH groups dissolved into a solvent in order to form a self-assembled monolayer and is then placed in another solution, where metallic ions are adsorbed to the surface of the film or where the functional groups are converted by chemical treatment. The substrate is then immersed in a solution containing organic molecules that are selectively chemisorbed to the functional groups. This process is sequentially repeated to form good, strong multilayers having a three-dimensionally ordered arrangement while also controlling film thickness.

22 Claims, 5 Drawing Sheets

METHOD FOR FABRICATING ORGANIC THIN FILM

BACKGROUND OF THE INVENTION

1. Field of the Invention

The present invention relates to a method for fabricating deposited organic films that are two-dimensionally and periodically arranged on a III–V group compound semiconductor substrate.

2. Description of the Prior Art

Conventional monomolecular or deposited organic films include Langmuir Blodgett films (hereafter referred to as "LB films") and self-assembled monolayers (Abraham Ulman: An Introduction to Ultrathin Organic Films From Langmuir-Blodgett to Self-Assembly, Academic Press 1991).

An LB film is formed by developing on a water surface, as a monomolecular film, amphipathic molecules including hydrophilic functional groups and hydrophobic atomic groups (an L film). The film is transferred onto a solid substrate, and several such films are deposited thereon, according to the process named after Langmuir and Blodgett. A self-assembled monolayer is obtained by allowing the functional groups at the terminals of molecules to be chemically adsorbed by the atoms constituting the substrate. This film is called the "self-assembled monolayer" because, due to the relevant adsorption mechanism, only monomolecular films are self-organized and formed on the substrate.

Films can also be accumulated by selecting the type of the terminal group away from a formed self-assembled monolayer. These monomolecular films form a two-dimensional monomolecular aggregate due to the Van der Waals between the molecules, and these methods can be used to manufacture a periodic array of molecular packing, that is, two-dimensional crystals. This feature can be used to construct electronic and optical devices.

Since an LB film is formed by transferring a film developed on the water surface, onto the substrate, using the difference between the hydrophobic and hydrophilic properties of the film and the substrate, the crystallinity of the film is primely determined when the film is expanded and compressed. Thus, the crystallinity of the film does not depend on the substrate materials, and the film can be formed on any substrate. The interaction between the substrate and the monomolecular film, however, is very weak due to the nature of the LB film, thus the film lacks the acid- and alkali-resistance and durability required to construct complicated devices.

On the other hand, the self-assembled monolayer does not have the above disadvantages, but due to the use of the chemical adsorption between the functional groups of molecules and the substrate, their range of combinations is limited. Monomolecular films have thus been implemented on substrates of silicon oxide, aluminum oxide, silver oxide, mica, gold, copper, or GaAs. For GaAs substrates, only self-assembled monolayers are obtained by treating the substrate with hydrochloric acid solution so as to provide arsen terminated surface, then coating it with a molten liquid of organic molecules including SE groups in a nitrogen atmosphere, and holding it at about 100 C for 5 hours.

Since, however, the self-assembled monolayer uses an As-terminated surface on GaAs, so the surface is amorphous and the two-dimensional crystallinity of a self assembled monolayer obtained has been very low, that is, the quality of this film has been lower than that of the LB film. The film quality directly compared to quantum efficiency that provides a functional characteristics of that monomolecular film, and thus contributes to producing substantial adverse effects in fabricating devices. Furthermore, despite the large number of advantages of the self-assembled monolayer compared to LB film, there have been no examples where a multilayer of self-assembled monolayers has been arranged on a III–V group compound semiconductor substrate; instead, self-assembled monolayers have been used only on silicon oxide film or a gold substrate. A technique that allows the formation of multilayers while preserving the numerous advantages of the self-assembled monolayer is very important because it enables the multilayers to include characteristics that cannot be implemented by more complicated monomolecular films and also enhance functional performance.

Since the self-assembled multilayers heretofore obtained have been formed on an amorphous silicon oxide film despite the use of monocrystal silicon for the substrate, such multilayers may not have an ordered structure along their lateral orientation or may have two-dimensional domain structures with a large number of pin holes.

To solve this problem, attempts have been made to provide a substrate the surface of which is flat on an atomic level and the atoms of which are periodically disposed (in a $\sqrt{3}\times23$ structure), with the multilayer then formed on this substrate. In these attempts, a single crystal or gold or an epitaxial thin film substrate of gold formed on a mica cleavage plane has been employed, using the EB deposition method. In these cases, however, since the surface of the substrate has a reconstructed (i.e., $\sqrt{3}\times23$) structure with a high atom packing density instead of the bulk structure, as well as a long-period, so-called "Herringbone" structure, excess gold atoms may be protruded and thus depressions may be formed on the substrate surface when a self-assembled mono- and multilayer are fomred thereon. Therefore the film itself has domain structures of only several 10 nm in size. Consequently, these organic films have degraded insulating and I–V characteristics. To improve the performance of organic films obtained along these lines, it is necessary to producean organic superlattice multilayer that is flat and dense onan atomic level and which has a two-dimensional order without pin holes. There is demand both for such an organic film and for a method to fabricate it.

BRIEF SUMMARY OF THE INVENTION

It is an objective of this invention to provide a method for fabricating a very good organic thin film that is flat and dense on an atomic level, has a periodically oredered arrangement in the lateral direction, and is free of pin holes, by allowing film formation molecules to be selectively chemisorbed to a III–V group compound semiconductor substrate. Using this approach, a good and firm organic monomolecular film may be produced which has few defects. Chemical adsorption allows different types of organic molecules to be deposited on the monomolecular film so as to control the film thickness from layer to layer with a molecular length scale.

To achieve this objective, an organic thin film fabricating method according to this invention basically involves cleaving a III–V group compound semiconductor substrate in a solution or a molten liquid containing amphipathic organic molecules with an SE group derivative at their terminal group, to allow the organic molecules to be adsorbed onto the freshly cleaved surface in order to form a first organic monomolecular film, and then immersing the substrate in a solution containing metallic ions to allow the ions to be adsorbed to the surface of the monomolecular film, or chemically treating the surface functional groups to convert them into OH groups, and then immersing the substrate in a solution containing organic molecules with functional groups selectively chemically adsorbed to the metallic ions or the OR groups, thereby depositing another organic molecular film onto the first organic monomolecular film.

In this method, by repeating depositing another organic molecular film onto the first organic monomolecular film, deposited films that have strong ionic or interaction or covalent binding forces and periodically ordered in-plane directions can be formed while controlling the film thickness in units of molecular length.

Due to the use of the cleaved surface of a III–V group compound semiconductor substrate and to the selective chemical adsorption produced by molecules with an SH group at their terminal group, the method according to this invention can form good monolayers and good deposited multilayers that are strongly bonded to the substrate and orderly arranged in both lateral and vertical directions. Therefore, this invention can maximize film function and produce films having acid and alkali resistance, durability, reliability, and desirable I–V or insulation characteristics.

DESCRIPTION OF EMBODIMENTS

Figure 1:
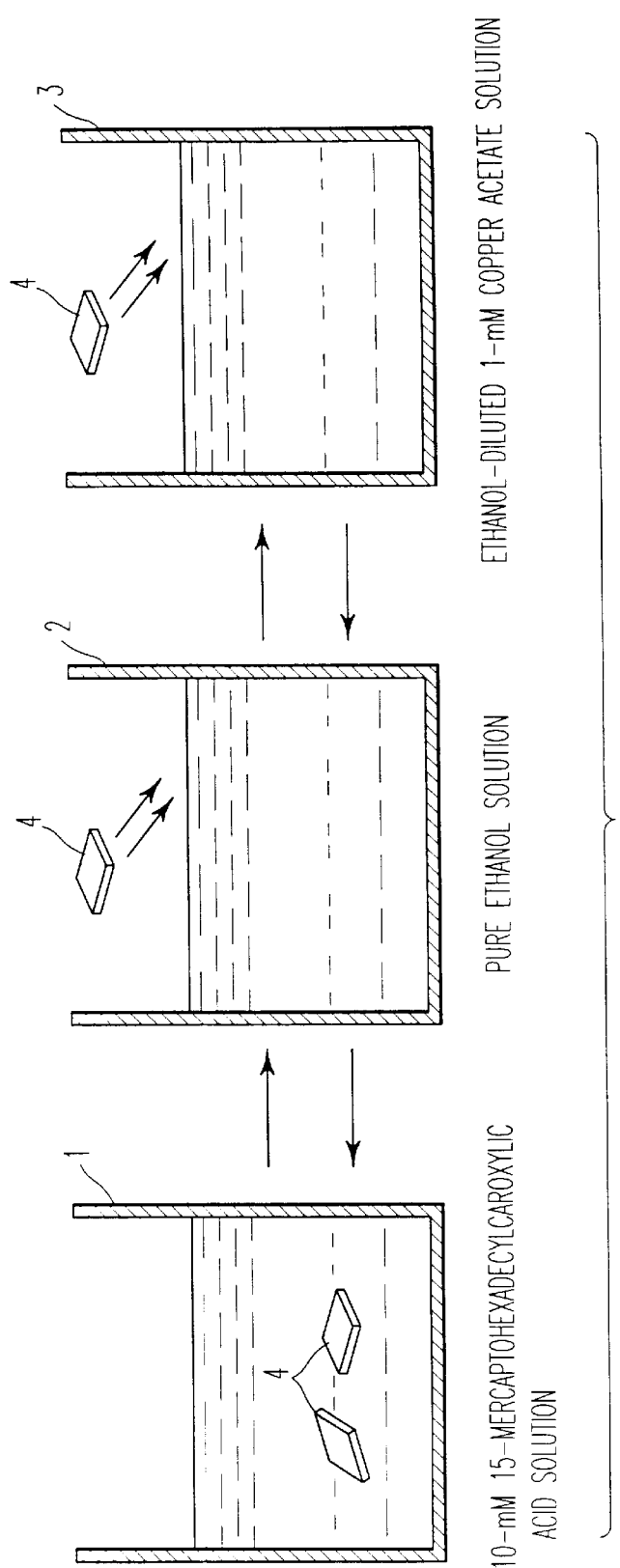
FIG. 1 is a schematic drawing of a method for fabricating thin deposited organic films described with reference to Embodiment 1 of this invention.

According to the organic thin film fabricating method under this invention, to form a first organic monomolecular film on a cleaved III–V group compound semiconductor substrate, the clean surface of the III–V group compound semiconductor substrate (which has been obtained by cleaving) is exposed to an organic solvent into which amphipathic organic molecules with an SH group derivative at their terminal groups are diluted, or to a raw or molten liquid of these organic molecules with a SH group, to allow the organic molecules to be chemically adsorbed to the cleaved surface in order to form a monomolecular film of these molecules, as described above. Exposure of the cleaved surface to the solution or molten liquid containing the amphipathic organic molecules is carried out by cleaving the semiconductor substrate in a controlled atmosphere of inert gas, cleaving it in the air and quickly immersing it in a liquid obtained by melting a solution containing amphipathic organic molecules or a raw liquid of amphipathic organic molecules, or by cleaving it in a solution or a molten liquid containing amphipathic organic molecules. Alternatively, after being cleaved in a controlled atmosphere, the substrate can then be immersed in a specified type of solution.

Specifically, the amphipathic organic molecules forming the first organic monomolecular film may be organic molecules with a COOH or $PO_3H_2$ group at the other end, and to deposit another organic monomolecular film on the first organic monomolecular film formed, the substrate is first immersed in a solution containing metallic ions and then in a solution containing either amphipathic molecules with an SE group at one end and a COOH group at the other, or amphipathic molecules with a $PO_3H_2$ group at both ends. This process may be repeated to deposit more layers.

In addition, the cleaved III–V group compound semiconductor substrate may be immersed in a solution with an SH group derivative at one end and a $COOCH_3$ group or a $CH_2=CH$ group at the other, in order to allow the organic molecules to be adsorbed to the cleaved surface and form the first organic monomolecular film. In this case, to deposit a subsequent organic monomolecular film, the substrate is first treated with a $LiAlH_4$ solution dissolved in an organic solvent and then a hydrochloric acid solution, or with a $B_2H_6$ solution dissolved in an organic solvent and then a mixed solution of sodium hydroxide and hydrogen peroxide to convert the surface function groups into OH groups, and is then immersed in a solution containing amphipathic molecules with a $COOCH_3$ group at one end and a $CH_2=CH$ group at the other. This process allows another organic monomolecular film to deposit on the first organic monomolecular film.

When 15-mercaptohexadecylcarboxylic acid ($SH(CH_2)_{16}COOH$) is used as an amphipathic organic molecules with an SH group derivative in its terminal group to form a thin organic film and if, for example, a III–V group compound semiconductor substrate is cleaved in a 15-mercaptohexadecylcarboxylic acid solution diluted to 10 mM with pure ethanol and remains immersed therein, an immersion time of 1 hour to 10 days may generally be used. A time of 2 hours to 3 days is preferable, with one of 4 hours to 1 day more preferable still. If a III–V group compound semiconductor substrate is cleaved in heated, molten 15-mercaptohexadecylcarboxylic acid, it is held in that condition for about several tens of minutes to 10 days after the cleaving. A holding time of 2 hours to 3 days is preferable, with a time of 4 to 5 hours more preferable still. Although this embodiment has been described in conjunction with the use of 15-mercaptohexadecylcarboxylic acid to obtain the monomolecular film, the general description is applicable to the formation of a molecular film with another SH group.

When an organic multilayer is deposited on the self-assembled monolayer produced on the cleaved surface of the III–V group compound semiconductor substrate after the first monomolecular film has been formed, and if, for example, the III–V group compound semiconductor substrate is immersed in a copper acetate ($(CH_3COO)_2Cu$) solution diluted to 1 mM with pure ethanol, an immersion time of 1 second to 10 minutes may be used. A time of 10 seconds to 5 minutes is preferable, with one of 30 seconds to 1 minute more preferable still. When a second layer of organic molecule film is deposited after the substrate has been taken out and subjected to ultrasonic cleaning with pure ethanol, and if, for example, a substrate with a self-assembled GaAs processed with Cu ions is immersed in 15-mercaptohexadecylcarboxylic acid diluted to 10 mM with pure ethanol, an immersion time of 30 minutes to 10 days may be used. Forty minutes to 1 day is preferable, with 1 to 4 hours more preferable still.

The second and subsequent layers can be deposited to obtain a specified thickness by alternatively immersing the substrate in a copper acetate solution and a 15-mercaptohexadecylcarboxylic acid solution.

Although this embodiment has been described in conjunction with the use of 15-mercaptohexadecylcarboxylic acid to deposit a multilayer, the general description is applicable to the formation of other forms of organic molecular based layered thin film. In addition, although the above embodiment has been described in conjunction with the limitation of a solution concentration of 10 mM, the immersion time must be adjusted depending on the concentration to obtain an organic molecular film such as that described above.

In the fabrication of an organic thin film, for a diluted solution containing amphipathic organic molecules, an oxygen impurity contained in a solvent is desirably removed from the solvent using evacuation, or a desiccating agent such as magnesium oxide is desirably fed into a solvent into which amphipathic organic molecules are dissolved, to remove moisture before removing the desiccating agent.

In addition, if organic molecules are used directly, chromatography is preferably used for re-extraction to increase the purity of the molecules. If the molecules are in a solid state at room temperature, the temperature must be approximately increased up to the melting point of the molecules. If the solution is molten, this is preferably carried out in an atmosphere of an inert gas such as nitrogen.

In addition to this embodiment of the invention, specific preferred embodiments are illustrated below.

[Embodiment 1]

FIG. 1 describes an embodiment of a method for fabricating an organic multilayer according to this invention. In this figure, a first vessel 1 is filled with a 10-mM 15-mercaptohexadecylcarboxylic acid ($SH(CH_2)_{15}COOH$) solution with an ethanol solvent and to manufacture an organic film, a GaAs substrate 4 is cleaved in the solution in the first vessel. The substrate 4 is cleaved by, for example, marking its surface at two positions and cutting the surface along the line joining the marks. The 15-mercaptohexadecylcarboxylic acid may be in powder or liquid form and may be chemically adsorbed either at room temperature or at elevated temperature. The solvent may be an organic solvent other than an ethanol solution or pure water, but is preferably an organic solvent. The solution is preferably deaired or dehydrated to prevent subsrate surface from oxidation and thereby from hampering formation of a self-assembled monolayer.

After being cleaved in the solution in the first vessel 1, the GaAs substrate 4 remains immersed in the solution for several hours (e.g., 4 hours) and is then taken out and cleaned in a second vessel 2 filled with pure ethanol to remove any excess 15-mercaptohexadecylcarboxylic acid molecules deposited on its surface. The substrate is then immersed in an ethanol-diluted 1-mM copper acetate (($CH_3COO)_2Cu$) solution for about 10 minutes. The copper acetate may be in powder or liquid and may be chemically adsorbed either at room temperature or at elevated temperature. The solvent may be an organic solvent other than an ethanol solution or pure water, but is preferably an organic solvent. The solution is preferably deaired or dehydrated to prevent the interface of the substrate from being oxidized to desorp the self-assembled monolayer from the substrate surface. Then, the GaAs substrate 4 is removed from the copper acetate solution in the third vessel 3 and transferred back to the pure ethanol in the second vessel, where it is ultrasonically cleaned to clear any excess Cu ions such as copper clusters deposited on its surface.

Figure 2:
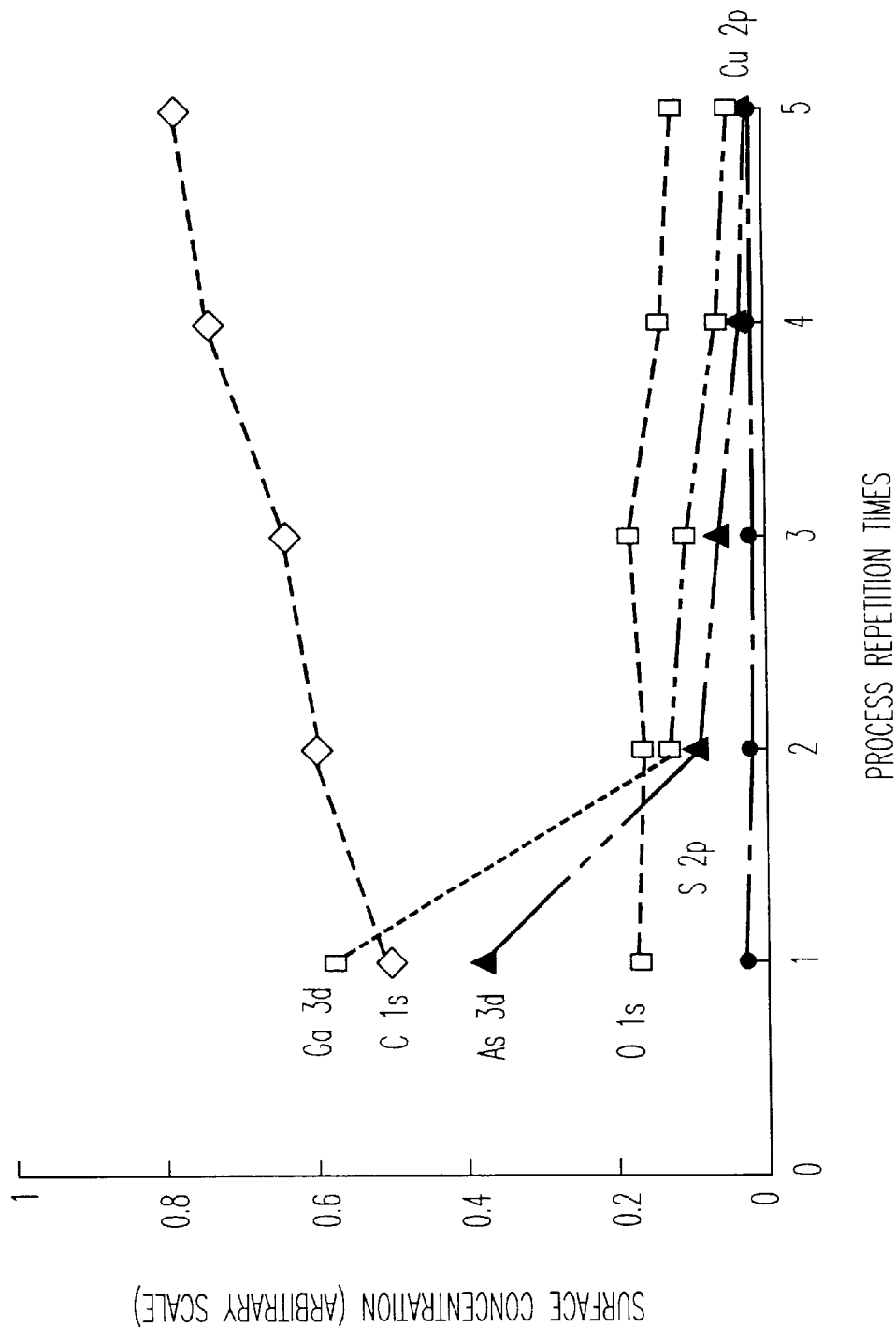
FIG. 2 shows a surface concentration of self-assembled multilayer formed on a cleaved GaAs as a function of treatment cycle with a 15-mercaptoacetic acid solution according to the embodiment of this invention, using X-ray photoelectron spectroscopy.

Then, the GaAs substrate 4 is transferred back to the 15-mercaptohexadecylcarboxylic acid solution in the first vessel 1 and immersed therein for about 2 hours, with a single layer of 15-mercaptohexadecylcarboxylic acid molecules allowed to be uniformly adsorbed its surface which is covered with Cu ions. The above process can be cyclically repeated on the GaAs substrate 4 using the second, third, second, and first vessels in order to cumulatively deposit layers of 15-mercaptohexadecylcarboxylic acid molecules. FIG. 2 shows surface concentration of Ga, As, Cu, O, C and S on the surface as a function of layer thickness from the first to fifth layers diposited using the above process by using X-ray photoelectron spectroscopy. This graph shows that despite the constant Cu and S, Ga and As decreases with increasing C and O as layers of 15-mercaptohexadecylcarboxylic acid molecules are cumulatively deposit Atomic Force microscope observation of the fifth layer of the deposited film shows that the surface was dense and flat on an atomic level, and without pin holes. Although this embodiment has been described in conjunction with the use of a GaAs substrate, a similar method can be applied to other III–V group compound semiconductor substrates and to GaP, GaSb, InP, InAs, and InSb substrates in order to deposit on their cleaved surfaces with dense and very uniform multilayers which are free of pin holes.

[Embodiment 2]

Figure 3:
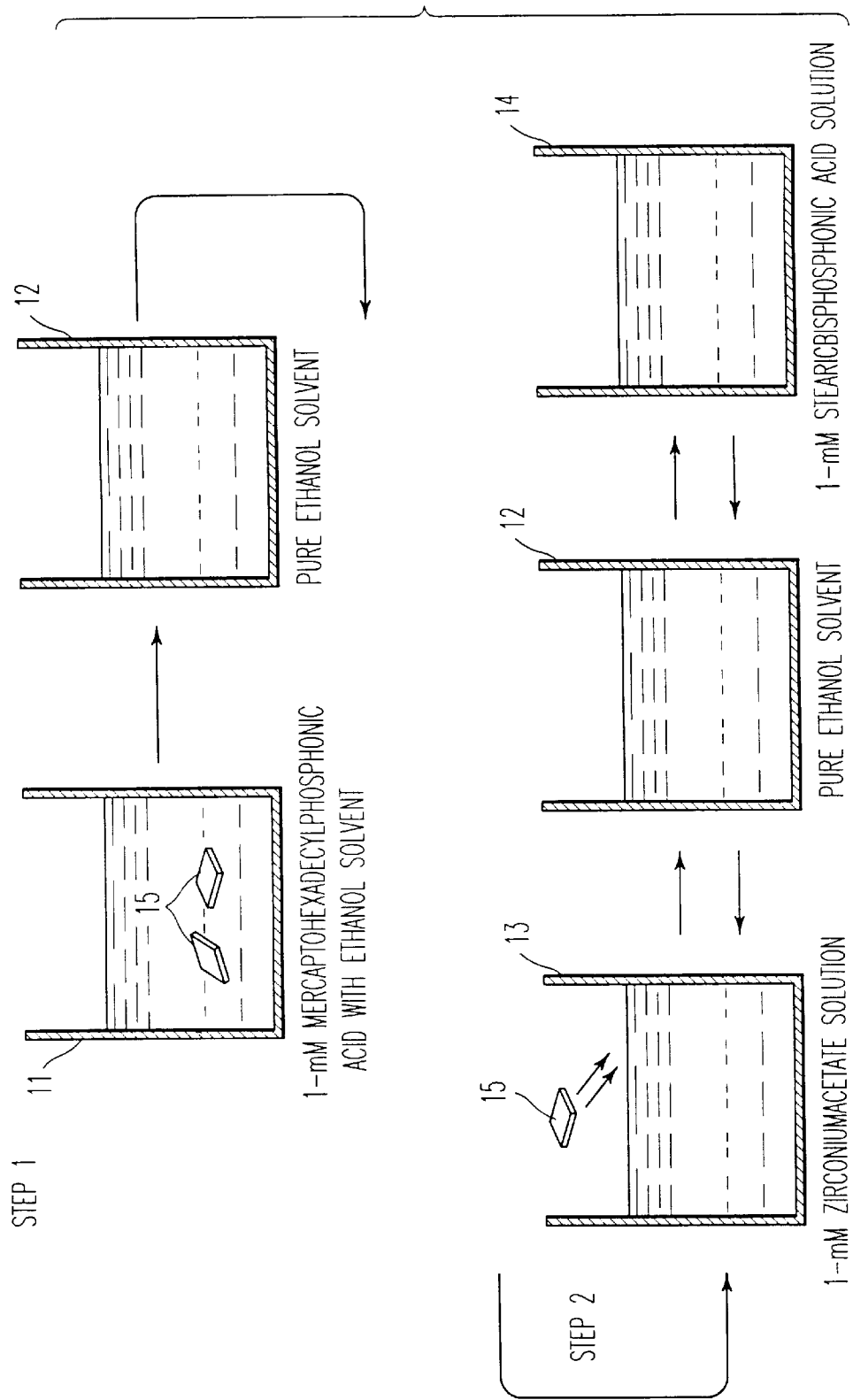
FIG. 3 is a schematic drawing of a method for fabricating self-assembled organic mono- and multilayer thin films describing it as Embodiment 2 of this invention.

FIG. 3 describes another embodiment of a method for fabricating a thin organic multilayer according to this invention. In this figure, a first vessel 11 is filled with a 1-mM 15-mercaptohexadecylphosphonic acid ($PO_3H_2(CH_2)_{15}SH$) solution. To fabricate organic films, a GaAs substrate 15 is cleaved in the solution in the first vessel 11. The substrate 15 can be cleaved as in Embodiment 1. The 15-mercaptohexadecylphosphonic acid may be in powder or liquid form and may be chemically adsorbed either at room temperature or at elevated temperature. The solvent may be an organic solvent other than an ethanol solution or pure water, but is preferably an organic solvent. The solution is preferably deaired or dehydrated to prevent substrate from oxidation and thereby from hampering formation of a self-assembled monolayer.

After being cleaved in the solution in the first vessel 11, the GaSb substrate 15 remains immersed in the solution for several hours (e.g., 5 hours) and is then taken out and washed in a second vessel 12 filled with pure ethanol to remove any excess 15-mercaptohexadecylphosphonic acid molecules deposited on its surface (step 1).

The substrate is then immersed in an ethanol-diluted 1-mM zirconium acetate (($CH_3COO)_4Zr$) solution for about 10 minutes. The zirconium acetate may be in powder or liquid form. The zirconium ions may be chemically absorbed either at room temperature of at an elevated temprature. The solvent may be an organic solvent other than an ethanol solution or pure water, but is preferably an organic solvent. The solution is preferably deaired or dehydrated to prevent the interface of the substrate from being oxidized to desorp the self-assembled monolayer from the substrate surface. Then, the GaSb substrate 15 is taken out from the solution in the third vessel 13 and transferred back to the pure ethanol in the second vessel, where it is ultrasonically cleaned to remove any excess Zr ions absorbed on its surface.

Then, the GaSb substrate 15 is placed in a 1-mM stearicbisphosphonic acid ($PO_8H_2(CH_2)_{18}PO_8H_2$) with an ethanol solvent and immersed therein for about 4 hours to allow a single layer of stearicbisphosphonic acid molecules to be adsorbed to the surface of the self-assembled monolayer of the GaSb substrate 15 which is covered with Zr ions (step 2).

Subsequently, step 2 (immersion in the third vessel 13) can be repeated via cleaning in the second vessel 12 to cumilatevely deposit layers of stearicbisphosphonic acid molecules.

After the above process was repeated five times, the film thickness was measured using ellipsometry. Thickness was about 14 nm, and it was confirmed that a single layer of mercaptohexadecylphosphonic acid and four layers of stearicbisphosphonic acid were formed. Although this embodiment has been described in conjunction with the use of a GaSb substrate, a similar method can be applied to other III–V group compound semiconductor substrates and to GaP, GaAs, InP, InAs, and InSb substrates to deposit a multilayer on their cleaved surfaces.

[Embodiment 3]

Figure 4:
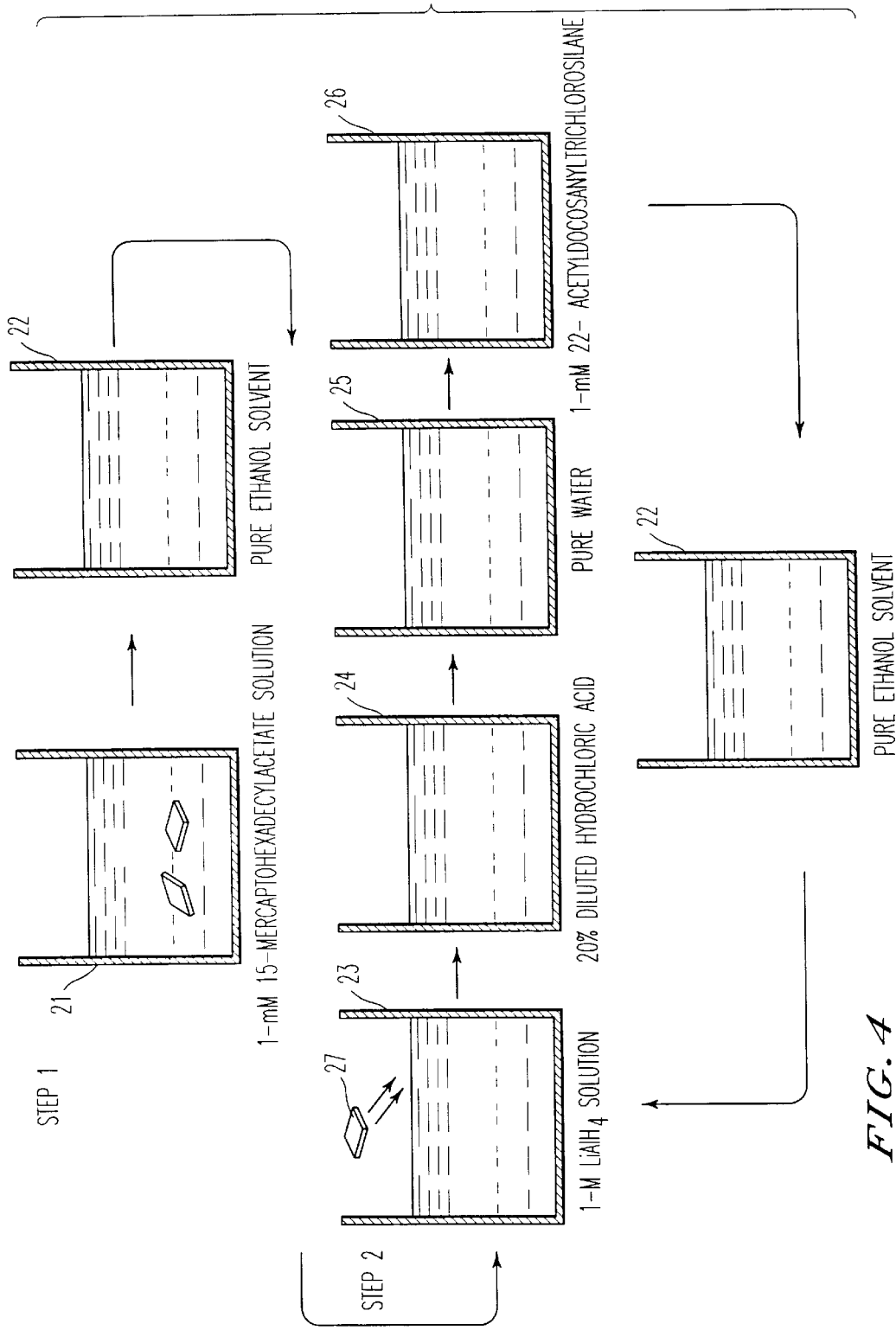
FIG. 4 schematic drawing of a method for fabricating self-assembled organic mono- and multilayer thin films describing it as Embodiment 3 of this invention.

FIG. 4 describes another embodiment of a method for fabricating thin organic multilayer according to this invention. In this figure, a first vessel 21 is filled with a mercaptohexadecylacetate ($CH_8COO(CH_2)_{15}SH$) solution. To fabricate organic films, an InSb substrate 27 is cleaved in the solution in the first vessel 21. The substrate 27 can be cleaved as in Embodiment 1. The mercaptohexadecylacetate may be in powder or liquid form and may be chemically adsorbed either at room temperature or at elevatd temperature. The solvent may be an organic solvent other than an ethanol solution or pure water, but is preferably an organic solvent. The solution is preferably deaired or dehydrated to prevent substrate surface from oxidation and thereby from hampering formation of a self-assembled monolayer.

The InSb substrate 27 remains immersed in the solution in the first vessel 21 for several hours and is then taken out and cleaned in a second vessel 22 filled with pure ethanol to remove any excess mercaptohexadecylacetate molecules deposited on its surface (step 1).

The substrate is then immersed in a 1-M $LiAlH_4$ solution dissolved into tetrahydrofuran in a third vessel 23 for about 10 minutes, followed by immersion in a 20% diluted hydrochloric acid solution in a fourth vessel 24 to convert terminal $COOCH_3$ groups away from the surface into OH groups. The $COOCH_3$ groups may be converted into OH groups at room temperature or at elevated temperatre. The solvent may be an organic solvent other than an ethanol solution or pure water, but is preferably an organic solvent. The solution is preferably deaired or dehydrated to prevent the interface of the substrate from being oxidized to desorp the self-assembled monolayer from the substrate surface. Subsequently, the InSb substrate 27 is taken out from the solution and cleaned with pure water in a fifth vessel 25.

Then, the InSb substrate 27 is placed in a 1-mM 22-acetyldocosanyltrichlorosilane ($CH_3COO(CH_2)_{22}SiCl_3$) solution dissolved into a solvent in a sixth vessel 26 containing hexadecane and carbon tetrachloride at a mixing ratio of 4:1 and immersed therein for about 4 hours to allow a single layer of 22-acetyldocosanyltrichlorosilane to be adsorbed to the surface of the self-assembled monolayer which is formed on the InSb substrate 27 and covered with OH groups (step 2).

Subsequently, step 2 can be repeated via cleaning in the second vessel 22 to cumulatively deposit layers of 22-acetyldocosanyltrichlorosilane. After the above process was repeated 10 times, the film thickness was measured using ellipsometry. Thickness was about 36 nm, and it was confirmed that a single layer of mercaptohexadecylacetate and 9 layers of 22-acetyldocosanyltrichlorosilane were formed. Although this embodiment has been described in conjunction with the use of an InSb substrate, a similar method can be applied to other III–V group compound semiconductor substrates and to GaP, GaAs, GaSb, InP, and InAs substrates to deposit a multilayer on their cleaved surfaces.

[Embodiment 4]

Figure 5:
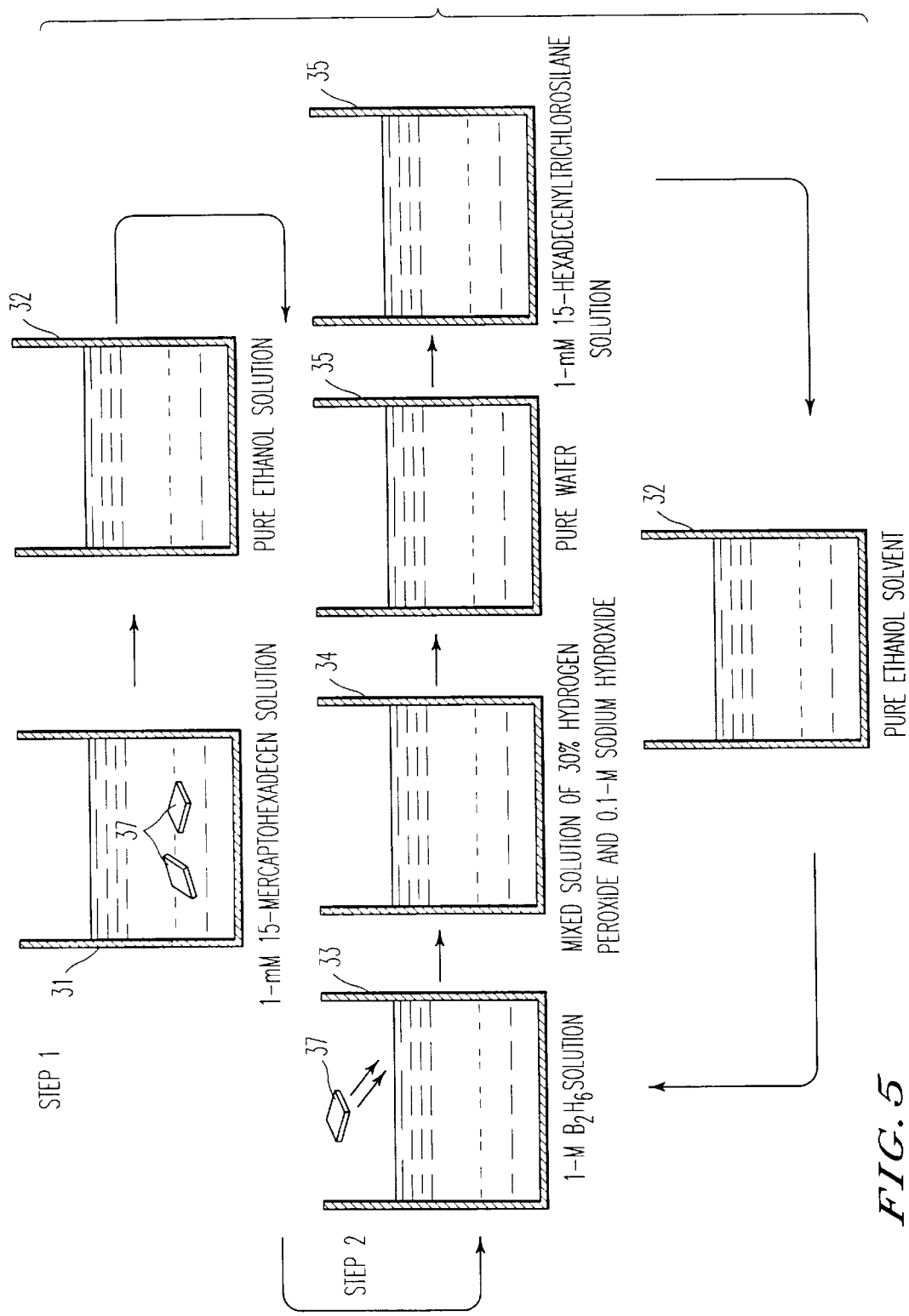
FIG. 5 schematic drawing of a method for fabricating self-assembled organic mono- and multilayer thin films describing it as Embodiment 4 of this invention.

FIG. 5 describes yet another embodiment of a method for fabricating a thin organic multilayer according to this invention. In this figure, a first vessel 31 is filled with a 1-mM 16-mercaptohexadecene ($CH_2$=$CH(CH_2)_{14}SH$) solution. To fabricate organic films, an InAs substrate 37 is cleaved in the solution in the first vessel 31. The substrate 37 can be cleaved as in Embodiment 1. The 16-mercaptohexadecene be chemically adsorbed at room temperature or at elevated temperature. The solvent may be an organic solvent other than an ethanol solution or pure water, but is preferably an organic solvent. The solution is preferably deaired or dehydrated to prevent substrate from oxidatand and thereby from hampering formation of a self-assembled monolayer.

The InAs substrate 37 remains immersed in the solution in the first vessel 31 for several hours and is then taken out and cleaned with pure ethanol in a second vessel 32 to remove any excess 16-mercaptohexadecene molecules deposited on its surface (step 1).

The substrate 37 is then immersed in a 1-M $B_2H_6$ solution dissolved into tetrahydrofuran in a third vessel 33 for about 1 minute, followed by immersion in a 0.1-M sodium hydroxide solution mixed with 30% hydrogen peroxide to convert the $CH_2$=$CH$ groups exposed at the surface into OH groups. The solvent may be an organic solvent other than a tetrahydrofuran solution or pure water, but is preferably an organic solvent. The solution is preferably deaired or dehydrated to prevent the interface of the substrate from being oxidized to desorp the self-assembled monolayer from the substrate surface. After immersion in the solution, the InAs substrate 37 is removed and cleaned with pure water in a fifth vessel 35.

Then, the InAs substrate 37 is placed in a 1-mM 15-hexadecenyltrichlorosilane ($CH_2$=$CH(CH_2)_{14}SiCl_2$) solution solved into a solvent in a sixth vessel 36 containing hexadecane and carbon tetrachloride at a mixing ratio of 4:1 and immersed therein for about 5 hours to allow a single layer of 15-hexadecenyltrichlorosilane to be adsorbed to the surface of the self-assembled monolayer which is formed on the InAs substrate 37 and covered with OH groups (step 2).

Subsequently, step 2 can be repeated via cleaning in the second vessel 32 to cumulatively deposit layers of 15-hexadecenyltrichlorosilane. After the above process was repeated 20 times, the film thickness was measured using ellipsometry. Thickness was about 45 nm, and it was confirmed that a single layer of 15-mercaptohexadecene and 19 layers of 15-hexadecenyltrichlorosilane were formed. Although this embodiment has been described in conjunction with the use of an InAs substrate, a similar method can be applied to other III–V group compound semiconductor substrates and to GaP, GaAs, GaSb, InP, and InSb substrates to deposit a multilayer on their cleaved surfaces.

What is claimed is:

1. An organic thin film fabricating method comprising an immersion of a cleaved III–V group compound semiconductor substrate in a solution or a molten liquid containing amphipathic organic molecules with an SH group derivative at their terminal groups, to allow the amphipathic organic molecules to be adsorbed to a cleaved surface in order to form a first organic monomolecular film; and further comprising an immersion of the substrate in a solution containing metallic ions and then in a solution containing amphipathic molecules with an SH group at one end and a COOH group at the other end, to deposit another layer of organic monomolecular film atop the fist organic monomolecular film.

2. An organic thin film fabricating method according to claim 1 wherein the amphipathic organic molecules forming the first organic monomolecular film are organic molecules with a COOH group at the other end.

3. An organic thin film fabricating method according to claim 1 wherein the amphipathic organic molecules forming the first organic monomolecular film are organic molecules with a $PO_3H_2$ group at the other end.

4. An organic thin film fabricating method comprising an immersion of a cleaved III–V group compound semiconductor substrate in a solution or a molten liquid containing amphipathic organic molecules with an SH group derivative at their terminal groups, to allow the amphipathic organic molecules to be adsorbed to a cleaved surface in order to form a first organic monomolecular film; and further comprising an immersion of the substrate in a solution containing metallic ions and then in a solution containing amphipathic molecules with a $PO_3H_2$ group at both ends, to deposit another layer of organic monomolecular film atop the first organic monomolecular film.

5. An organic thin film fabricating method according to claim 4 wherein the amphipathic organic molecules forming the first organic monomolecular film are organic molecules with a COOH group at the other end.

6. An organic thin film fabricating method according to claim 4 wherein the amphipathic organic molecules forming the first organic monomolecular film are organic molecules with a $PO_3H_2$ group at the other end.

7. An organic thin film fabricating method comprising an immersion of a cleaved III–V group compound semiconductor substrate in a solution containing amphipathic organic molecules with an SH group derivative at one end and a $COOCH_3$ group at the other end, to allow the amphipathic organic molecules to be adsorbed to a cleaved surface in order to form a first organic monomolecular film; and further comprising an treatment of the substrate with an $LiAlH_4$ solution dissolved in an organic solvent and with a diluted hydrochloric acid solution, followed by immersion of the substrate in a solution containing amphipathic molecules with a $COOCH_3$ group at one end and an $SiCl_5$ group at the other end, in order to deposit another layer of organic monomolecular film atop the first organic monomolecular film.

8. An organic thin film fabricating method comprising an immersion of a cleaved III–V group compound semiconductor substrate in a solution containing amphipathic organic molecules with an SH group derivative at one end and a $CH_2=CH$ group at the other end, to allow the amphipathic organic molecules to be adsorbed to a cleaved surface in order to form a first organic monomolecular film, followed by treatment of the substrate with a $B_2H_6$ solution dissolved in an organic solvent and with a mixed solution of sodium hydroxide and hydrogen peroxide in a pure water; and further comprising an immersion of the substrate in a solution containing amphipathic molecules with a $CH_2=CH$ group at one end and an $SiCl_3$ group at the other end, to accumulate another layer of organic monomolecular film atop the first organic monomolecular film.

9. An organic thin film fabricating method according to claims 1, 4, 7 or 8 wherein after being cleaved in an atmosphere of inert gas or in the air, a III–V group compound semiconductor substrate is immediately immersed in a solution containing amphipathic organic molecules or a molten liquid obtained by heating a raw material of amphipathic organic molecules.

10. An organic thin film fabricating method according to claims 1, 4, 7 or 8 wherein the III–V group compound semiconductor substrate is cleaved in a solution containing amphipathic organic molecules or a molten liquid obtained by melting a raw liquid of amphipathic organic molecules.

11. An organic thin film fabricating method according to claims 1, 4, 7 or 8 wherein the solution containing amphipathic organic molecules is evacuated.

12. An organic thin film fabricating method according to claim 9 wherein the solution containing amphipathic organic molecules is deaerated by evacuating the vessel.

13. An organic thin film fabricating method according to claim 10 wherein the solution containing amphipathic organic molecules is deaerated by evacuating the vessel.

14. An organic thin film fabricating method according to claims 1, 4, 7 or 8 wherein a desiccating agent is fed in a solvent into which amphipathic organic molecules are dissolved to remove water impurity.

15. An organic thin film fabricating method according to claim 9 wherein a desiccating agent is fed in a solvent into which amphipathic organic molecules are dissolved to remove water impurity.

16. An organic thin film fabricating method according to claim 10 wherein a desiccating agent is fed in a solvent into which amphipathic organic molecules are dissolved to remove water impurity.

17. An organic thin film fabricating method according to claims 1, 4, 7 or 8 wherein a process for accumulating another organic monomolecular film on an initial layer of organic monomolecular film is repeated to sequentially deposit multiple layers of organic film.

18. An organic thin film fabricating method according to claim 9 wherein a process for accumulating another layer of organic monomolecular film on an initial layer of organic monomolecular film is repeated to sequentially deposit multiple layers of organic films.

19. An organic thin film fabricating method according to claim 10 wherein a process for depositing another layer of organic monomolecular film on an initial layer of organic monomolecular film Is repeated to sequentially deposit multiple layers of organic film.

20. An organic thin film fabricating method according to claim 11 wherein a process for depositing another layer of organic monomolecular film on an initial layer of organic monomolecular film is repeated to sequentially deposit multiple layers of organic film.

21. An organic thin film fabricating method according to claim 14 wherein a process for depositing another layer of organic monomolecular film on an initial layer of organic monomolecular film is repeated to sequentially deposit multiple layers of organic film.

22. An organic thin film fabricating method according to claims 12, 13, 15, or 16 wherein a process for depositing another layer of organic monomolecular film on an initial layer of organic monomolecular film is repeated to sequentially deposit multiple layers of organic film.

* * * * *

UNITED STATES PATENT AND TRADEMARK OFFICE
CERTIFICATE OF CORRECTION

PATENT NO. : 5,970,381

DATED : Oct. 19, 1999

INVENTOR(S): Hirotaka OHNO, et al.

It is certified that an error appears in the above-identified patent and that said Letters Patent is hereby corrected as shown below:

On Title page,
Item [73], the Assignee data, is incorrect. It should read as follows:

--[73] Assignees: Agency of Industrial Science and Technology, Tokyo, Japan; Sharp Kabushiki Kaisha, Osaka, Japan; Motorola Incorporated, Schaumburg, Illinois Signed and Sealed this Tenth Day of April, 2001

Attest:

NICHOLAS P. GODICI

Attesting Officer

Acting Director of the United States Patent and Trademark Office